United States Patent [19]
Morita et al.

[11] Patent Number: 6,153,951
[45] Date of Patent: Nov. 28, 2000

[54] STRUCTURE OF LINEAR COMPRESSOR

[75] Inventors: Ichiro Morita; Masanori Kobayashi; Koh Inagaki, all of Fujisawa; Makoto Katayama, Zushi, all of Japan

[73] Assignee: Matsushita Refrigeration Company, Osaka, Japan

[21] Appl. No.: 09/511,785

[22] Filed: Feb. 23, 2000

Related U.S. Application Data

[62] Division of application No. 09/187,005, Nov. 6, 1998.

[30] Foreign Application Priority Data

Apr. 20, 1998 [JP] Japan ................................ 10-109110
Apr. 21, 1998 [JP] Japan ................................ 10-110473

[51] Int. Cl.$^7$ .................................................. H02K 41/00
[52] U.S. Cl. ........................... 310/12; 310/258; 310/259; 310/217
[58] Field of Search ................................ 310/14, 23, 30, 310/194, 216, 217, 254, 258, 259

[56] References Cited

U.S. PATENT DOCUMENTS

| | | |
|---|---|---|
| 4,353,220 | 10/1982 | Curwen et al. ........................... 62/228 |
| 4,538,086 | 8/1985 | Marsh et al. ............................... 310/58 |
| 5,897,296 | 4/1999 | Yamamoto et al. .................... 417/44.1 |
| 6,060,810 | 5/2000 | Lee et al. ................................. 310/254 |

FOREIGN PATENT DOCUMENTS 0161429  11/1985  European Pat. Off. .

*Primary Examiner*—Elvin Enad
*Assistant Examiner*—Judson H. Jones
*Attorney, Agent, or Firm*—Louis Woo

[57] ABSTRACT

A linear compressor is provided which may be employed in refrigerators or air conditioners. The linear compressor includes a compressor mechanism disposed within a hermetic casing. The compressor mechanism includes a linear motor which makes a piston reciprocate within a cylinder and a piston oscillation controller. The piston oscillation controller controls oscillations of the piston so as to bring an actual top dead center position of the piston into agreement with a reference top dead center position and alters the reference top dead center position based on a given parameter such as an ambient temperature or a required thermal load of, for example, a refrigerator. An improved structure of the linear motor is also provided.

8 Claims, 9 Drawing Sheets

STRUCTURE OF LINEAR COMPRESSOR

This application is a division of application Ser. No. 08/187,005 filed Nov. 6, 1998.

BACKGROUND OF THE INVENTION

1. Technical Field of the Invention

The present invention relates generally to an improved structure of a linear compressor which may be used in refrigerators or air conditioners.

2. Background of Related Art

Japanese Patent First Publication No. 8-247025 discloses a linear compressor for use in a refrigerator which is designed to keep a top clearance between a cylinder head and the head of a piston when lying at the top dead center constant for avoiding an overstroke of the piston. The linear compressor, however, has the drawback in that a decrease in ambient temperature or thermal load of the refrigerator results in excess of a refrigerating capacity because of the constant top clearance.

The conventional linear compressor also encounters another drawback in that the efficiency of a linear motor which moves the piston linearly is poor because of an increased copper loss of a coil.

SUMMARY OF THE INVENTION

It is therefore a principal object of the present invention to avoid the disadvantages of the prior art.

It is another object of the present invention to provide an improved structure of a compressor which has a high efficiency.

According to one aspect of the present invention, there is provided a linear compressor which comprises: (a) a hermetic casing; (b) a block having formed therein a cylinder within which a piston oscillates to change a volume of a compression chamber; (c) a linear motor moving the piston within the cylinder in a first direction; (d) an elastic unit which is connected at a first portion to the block and at a second portion to the piston to urge the piston in a second direction opposite the first direction in response to the movement of the piston through the linear motor so that the piston oscillates in the cylinder; (e) a piston position sensor detecting a position of the piston to provide a position signal indicative thereof; (f) a top dead center position determining circuit determining an actual top dead center position of the piston based on the position signal provided by the piston position sensor; (g) an oscillation control circuit controlling oscillation of the piston so that a difference between the actual top dead center position and a reference top dead center position of the piston is decreased; and (h) a reference top dead center position changing circuit changing the reference top dead center position.

In the preferred mode of the invention, an ambient temperature sensor is further provided which measures an ambient temperature. The reference top dead center position changing circuit changes the reference top dead center position based on the ambient temperature measured by the ambient temperature sensor.

An operating condition determining circuit is further provided which determines a compressor output request. The reference top dead center position changing circuit changes the reference top dead center position based on the compressor output request determined by the operating condition determining circuit.

According to the second aspect of the invention, there is provided a linear compressor which comprises: (a) a hermetic casing; (b) a block having formed therein a cylinder within which a piston oscillates to change a volume of a compression chamber; (c) a linear motor including a stator and a rotor, the rotor being connected to the piston to move the piston within the cylinder in a first direction; (d) an elastic unit which is connected at a first portion to the block and at a second portion to the piston to urge the piston in a second direction opposite the first direction in response to the movement of the piston through the linear motor so that the piston oscillates in the cylinder; (e) a pressure chamber formed in the block; (f) a stator moving member having disposed thereon the stator of the linear motor, the stator moving member being mounted within the pressure chamber slidably in the first and second directions; (g) first and second back pressure chambers defined in the pressure chamber on both sides of the stator moving member; and (h) a pressure controlling mechanism controlling a difference in pressure between the first and second back pressure chambers to shift the stator moving member, thereby moving the stator to a desired position.

In the preferred mode of the invention, the block also has formed therein an inlet and an outlet communicating with the compression chamber. The pressure controlling mechanism selectively establishes and blocks communications between the inlet and the first back pressure chamber and between the outlet and the second back pressure chamber.

An urging mechanism is further provided which urges the stator of the linear motor away from the compression chamber.

According to the third aspect of the invention, there is provided a linear motor which comprises: (a) a rotor; and (b) a stator including a coil and an annular yoke retaining therein the coil, the yoke being made of a plurality of arc-shaped blocks each of which has formed therein a groove in which a peripheral portion of the coil is fitted.

According to the fourth aspect of the invention, there is provided a linear motor which comprises: (a) a rotor; and (b) a stator including an annular yoke, the yoke being formed with a plurality of blocks each constituting a circumferential portion of the yoke, each of the blocks including a central section and first and second outer sections disposed on both sides of the central section, the central section being made consisting of laminations made from a material having a higher permeability, the first and second outer sections each being made from a material having a permeability lower than that of the central section and an electric resistance greater than that of the central section.

In the preferred mode of the invention, the laminations making up the central section of each of the blocks of the yoke are laid to overlap each other in a circumferential direction of the yoke.

The central section of each of the blocks of the yoke is quadrangular prism-shaped, and each of the first and second outer sections is triangular prism-shaped.

The central section and the first and second outer sections are joined to each other using resin.

The first outer section of each of the blocks of the yoke has a protrusion formed on a surface facing in a circumferential direction of the yoke. The second outer section has formed in a surface facing the circumferential direction of the yoke a groove in which the protrusion is fitted for joining the blocks to each other to complete the yoke.

According to the fifth aspect of the invention, there is provided a linear motor which comprises: (a) a rotor; (b) a stator including an annular yoke, the yoke being formed with a plurality of blocks each constituting a circumferential portion of the yoke, each of the blocks being formed with laminations made from a material having a higher permeability; and (c) an annular retainer retaining the blocks on an inner surface thereof at regular intervals in a circumferential direction of the retainer, the retainer including a strip member and holders, the strip member being made from a material having a permeability lower than that of the yoke and an electric resistance greater than that of the yoke, each of the holders holding therein one of the blocks and being glued on the strip member.

In the preferred mode of the invention, each of the holders is made of a C-shaped member having disposed therein one of the blocks.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
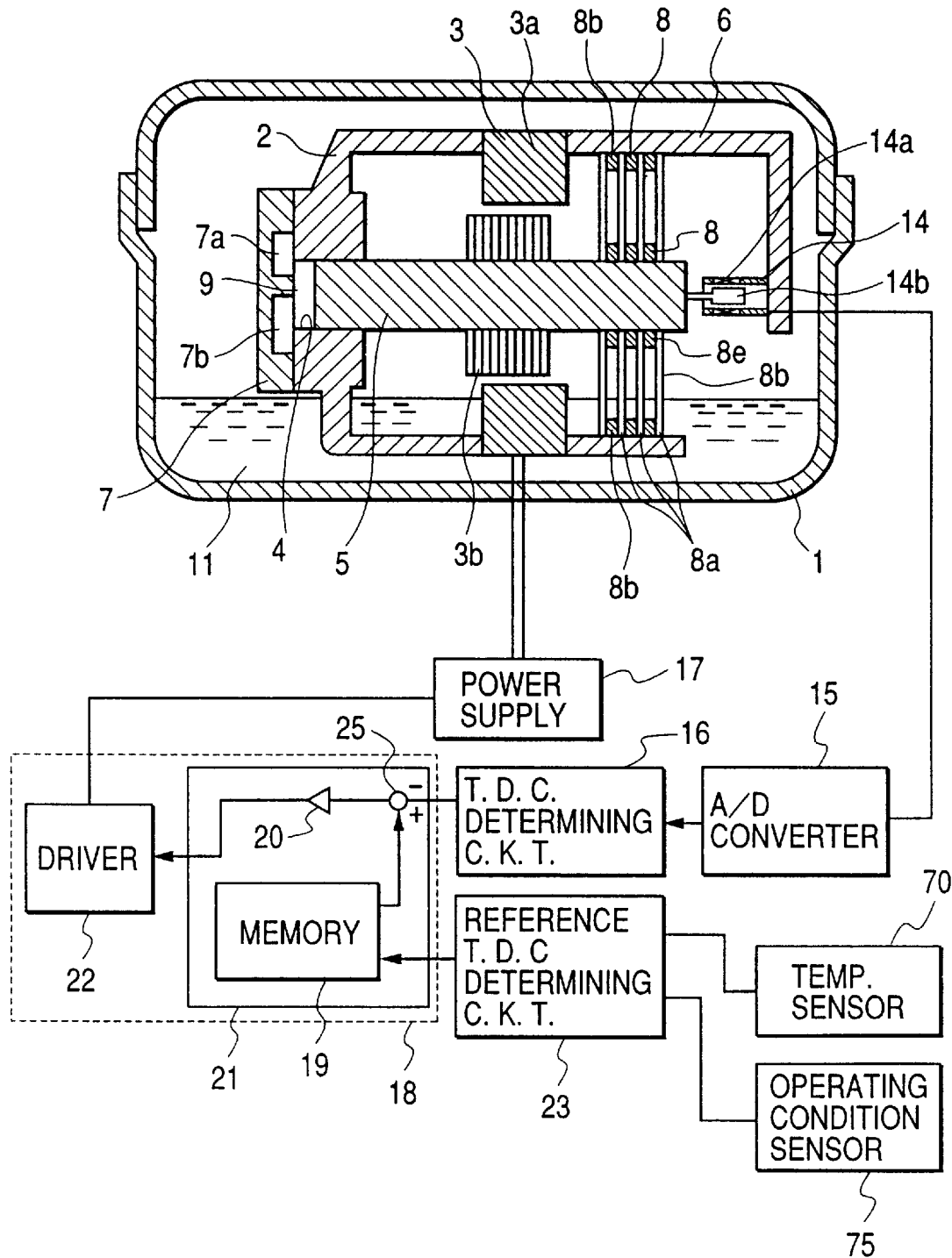
FIG. 1 is an illustration which shows a linear compressor according to the first embodiment of the invention.

Referring now to the drawings, particularly to FIG. 1, there is shown a linear compressor (also called a vibrating compressor) according to the present invention which. The following discussion will refer to the linear compressor as being used in a refrigerating system such as a refrigerator, but the present invention is not limited to the same.

The linear compressor includes generally a hermetic casing 1 and a compressor mechanism 2.

The compressor mechanism 2 includes a linear motor 3, a cylinder 4, a piston 5, a hollow block 6, a cylinder head 7, and a spring assembly 8 and is supported within the casing 1 through suspension springs (not shown). A lubricating oil 11 is settled on the bottom of the casing 1.

The block 6 has formed therein the cylinder 4 within which the piston 5 reciprocates to suck, for example, a refrigerant from the inlet 7a into a compression chamber 9 and to discharge it from the outlet 7b to the refrigerating system.

The motor 3 consists of an annular stator 3a and a rotor 3b mounted on the piston 5. The stator 3a is mounted in a peripheral wall of the block 6. Instead of the motor 3, any other known moving mechanisms may be used which are capable of reciprocating the piston 5.

The spring assembly 8 which consists of four spring discs 8a laid to overlap each other and outer and inner annular spacers 8b and 8c disposed between adjacent two of the spring discs 8a. Each of the spring discs 8a has formed therein, for example, arc-shaped slits to define spring arms and is connected at the center to the periphery of the piston 5 and at an outer edge to an inner wall of the hollow block 6.

The linear compressor also includes a piston position sensor 14, an A/D converter 15, a top dead center determining circuit 16, a reference top dead center position determining circuit 23, an oscillation controller 18, and an ac power supply 17. The oscillation controller 18 includes a reciprocating motion controller 21 and a base driver 22. The reciprocating motion controller 21 includes a reference top dead center position memory 19, an amplifier 20, a comparator 25.

The piston position sensor 14 is implemented by a differential transformer and consists of a cylindrical coil 14a and a core 14b made of a permanent magnet. The cylindrical coil 14a is connected to an inner end wall of the hollow block 6. The core 14b is connected to the bottom of the piston 5. The movement of the core 14b (i.e., the piston 5) causes the coil 14a to output an electric signal indicative of the position of the piston 5 in an analog form to the A/D converter 15. The A/D converter 15 converts the input signal into a digital signal and outputs it to the top dead center determining circuit 16. The top dead center determining circuit 16 monitors the position of the piston 5 based on the signal from the A/D converter 15 to output a top dead center signal to the reciprocating motion controller 21 when the piston 5 has reached the top dead center. The reciprocating motion controller 21 compares through the comparator 25 an actual top dead center position of the piston 5 indicated by the top dead center signal with a reference top dead center position stored in the reference top dead center position memory 19 to change the amplitude of a voltage signal outputted through the amplifier 20 to the base driver 22 according to the difference between the actual top dead center position and the reference top dead center position. The base driver 22 controls the supply of power (i.e., an output voltage) from the power supply 17 to the motor 3 based on the inputted voltage signal to adjust the movement of the piston 5 so that the difference between the actual top dead center position and the reference top dead center position is decreased to zero.

The reference top dead center position determining circuit 23 is connected to a temperature sensor 70 and an operating condition sensor 75. The temperature sensor 70 measures an ambient temperature. The operating condition sensor 75 monitors a given operating condition such as a required thermal load (i.e., a refrigeration demand) of the refrigerating system as a function of the temperature within a refrigerating chamber of the refrigerating system (e.g., a refrigerator).

The reference top dead center position determining circuit 23 alters the reference top dead center position stored in the memory 19 according to the ambient temperature measured by the temperature sensor 70 and the operating condition of the refrigerating system monitored by the operating condition sensor 75.

In operation, when the power supply 17 is turned on, the rotor 3*b* of the motor 3 is excited and attracted in a horizontal direction, as viewed in the drawing, along with the piston 5, pressing the spring assembly 8. The spring assembly 8 produces a reactive force to move the piston 5 in the opposite direction, thereby causing the piston 5 to oscillate, increasing and decreasing the volume of the compression chamber 9 alternately.

The oscillation controller 18 adjusts, as described above, the output voltage from the power supply 17 to the motor 3 so that the difference between the actual top dead center position of the piston 5 monitored by the piston position sensor 14 and the reference top dead center position stored in the memory 19 may be decreased to zero. The top clearance of the piston 5 (i.e., the gap between the head of the piston 5 at the top dead center and an inner wall of the cylinder head 7) is, thus, kept constant.

When the ambient temperature and/or the required thermal load monitored by the temperature sensor 70 and the operating condition sensor 75 are decreased, it will cause a required refrigerating capacity of the linear compressor to be lowered. The reference top dead center position determining circuit 23 selects one of reference top dead center positions by look-up using a map based on the monitored ambient temperature and the thermal load of the refrigerating system and alters the reference top dead center position now stored in the memory 19 of the reciprocating motion controller 21 so as to increase the top clearance of the piston 5. An increase in top clearance of the piston 5 causes the refrigerating capacity of the linear compressor to be lowered, thereby avoiding the excess of the compression capacity of the linear compressor (i.e., the capacity of the refrigerating system).

The linear compressor may also include a quick refrigeration manual switch (not shown) which is installed in an operation panel of the refrigerator. When the quick refrigeration manual switch is turned on by an operator, the reference top dead center position determining circuit 23 alters the reference top dead center position stored in the memory 19 so as to decrease the top clearance of the piston 5 for enhancing the refrigerating capacity regardless of the outputs from the temperature sensor 70 and the operating condition sensor 75.

Figure 2:
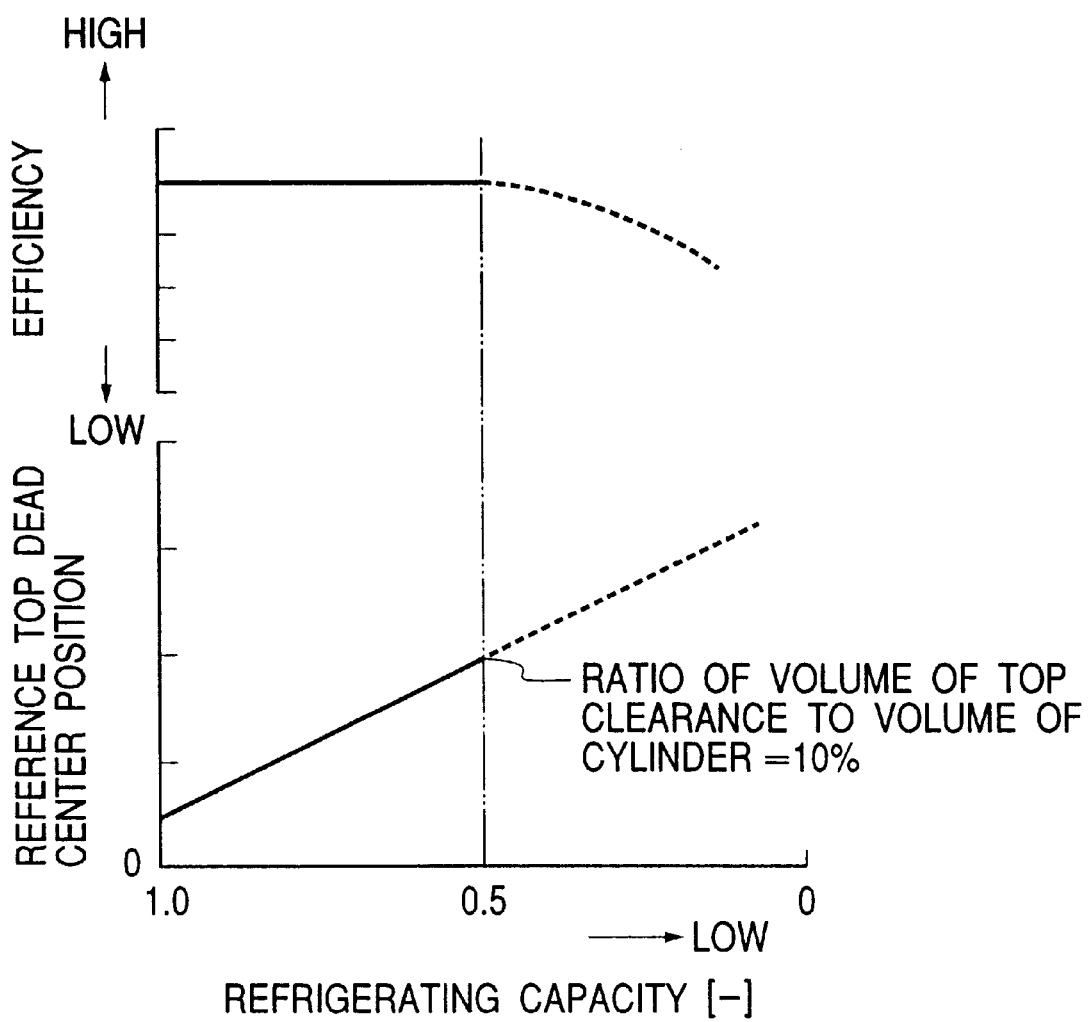
FIG. 2 is a graph which shows the efficiency of a linear compressor and a reference top dead center position in terms of the refrigerating capacity.

FIG. 2 shows results of tests performed by the inventors of this application and shows that a change in reference top dead center position to increase the top clearance of the piston 5 causes the refrigerating capacity of the linear compressor to be lowered, but the efficiency of the linear compressor hardly changes until a ratio of the volume of the top clearance of the piston 5 to the volume of the cylinder 4 reaches 10%. Specifically, within a range of the ratio of the volume of the top clearance of the piston 5 to the volume of the cylinder 4 of 10%, the refrigerating capacity may be lowered to approximately half according to the environmental and refrigerating conditions without degrading the efficiency of the linear compressor and the entire refrigerating system.

Figure 3:
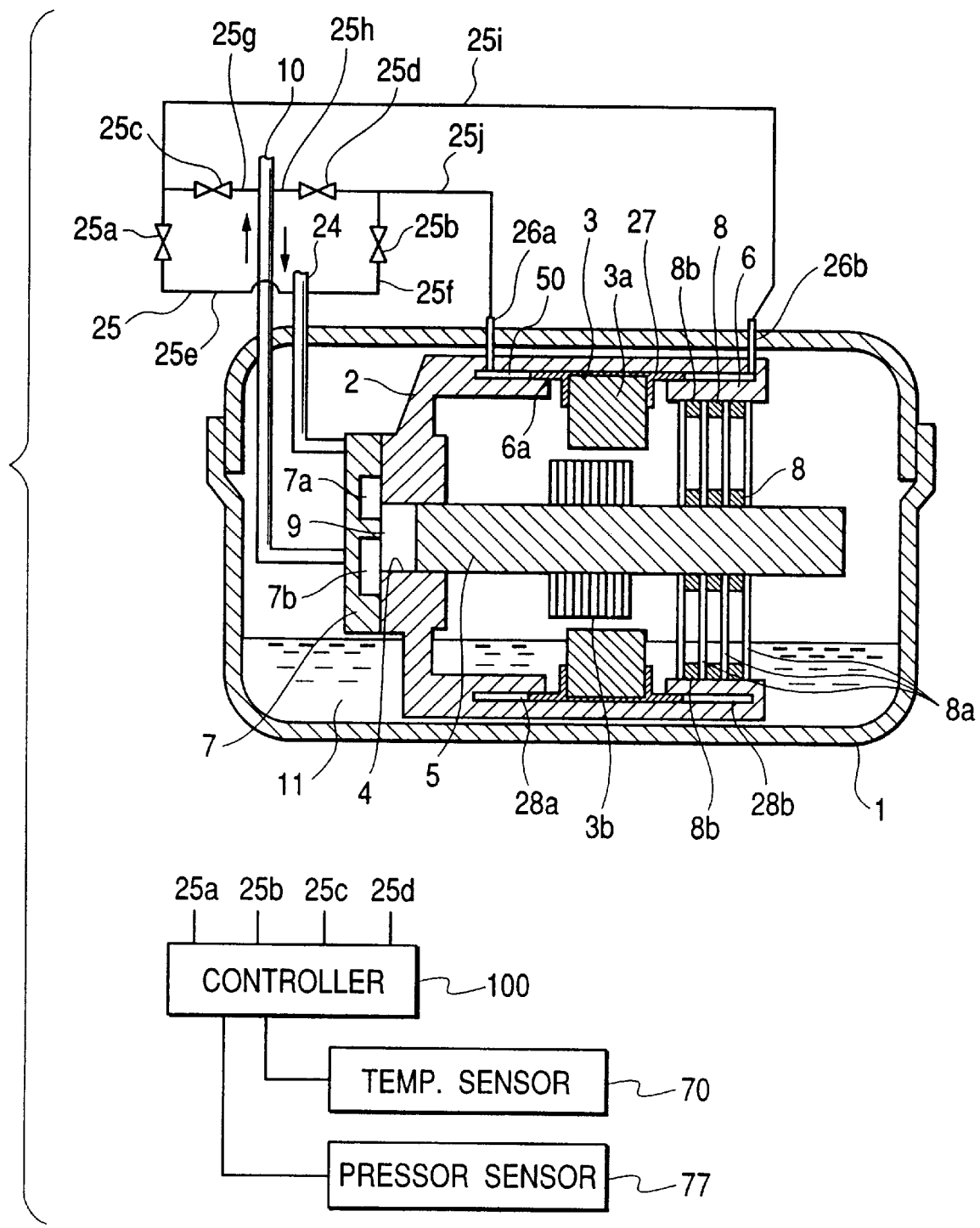
FIG. 3 is a cross sectional view which shows a linear compressor according to the second embodiment of the invention.

FIG. 3 shows a linear compressor according to the second embodiment of the invention. The same reference numbers as employed in FIG. 1 refer to the same parts, and explanation thereof in detail will be omitted here.

The linear compressor includes an annular stator moving base 27, a pressure control system 25, and a controller 100.

The stator moving base 27 rigidly holds the stator 3*a* of the motor 3 on an inner wall thereof and is disposed within an annular chamber 50 formed in a peripheral wall of the hollow block 6. The annular chamber 50 has first and second back pressure chambers 26*a* and 26*b* defined between ends of the annular chamber 50 and ends of the stator moving base 37, respectively.

The pressure control system 25 includes pressure control valves 25*a*, 25*b*, 25*c*, and 25*d*, connecting pipes 25*e*, 25*f*, 25*g*, and 25*h*, and pressure pipes 25*i* and 25*j*. The connecting pipes 25*e* and 25*f* connect a suction pipe 24 which leads to the inlet 7*a* of the compressor mechanism 2 with the pressure control valves 25*a* and 25*b*, respectively. The connecting pipes 25*g* and 25*h* connect a discharge pipe 10 which leads to the outlet 7*b* of the compressor mechanism 2 with the pressure control valves 25*c* and 25*d*, respectively. The pressure pipe 25*i* connects the pressure control valves 25*a* and 25*c* with the back pressure chamber 28*b* through a back pressure pipe 26*b* extending through the casing 1. The pressure pipe 25*j* connects the pressure control valves 25*b* and 25*d* with the back pressure chamber 28*a* through a back pressure pipe 26*a* extending through the casing 1. Each of the pressure control valves 25*a* to 25*d* is, for example, a solenoid valve which is actuated by the controller 100.

The linear compressor of this embodiment also includes a temperature sensor 70 measuring the ambient temperature and a pressure sensor 77 measuring the pressure of a refrigerant within the discharge pipe 10 which are connected to the controller 100.

When the ambient temperature and/or the pressure of the refrigerant discharged from the outlet 7*b* of the compressor mechanism 2 are decreased, it will cause the piston 5 to be moved left, as viewed in the drawing, over the top dead center so that it may collide with the inner wall of the cylinder head 7. Therefore, when either or both of outputs from the temperature sensor 70 and the pressure sensor 77 exceed given lower threshold values, the controller 100 opens the pressure control valves 25*a* and 25*d* while it closes the pressure control valves 25*b* and 25*c* to establish communications between the back pressure chamber 28*a* and the outlet 7*b* and between the back pressure chamber 28*b* and the inlet 7*a* of the compressor mechanism 2. The inner pressure of the back pressure chamber 28*a* is, thus, increased, while the pressure of the back pressure chamber 28*b* is decreased, thereby causing the stator moving base 27 to be urged right, as viewed in the drawing, to shift the center of oscillation of the piston 5 away from the cylinder block 7. This avoids the collision of the piston 5 with the inner wall of the cylinder head 7 which will contribute to unwanted mechanical noise and damage of the piston 5.

Figure 4:
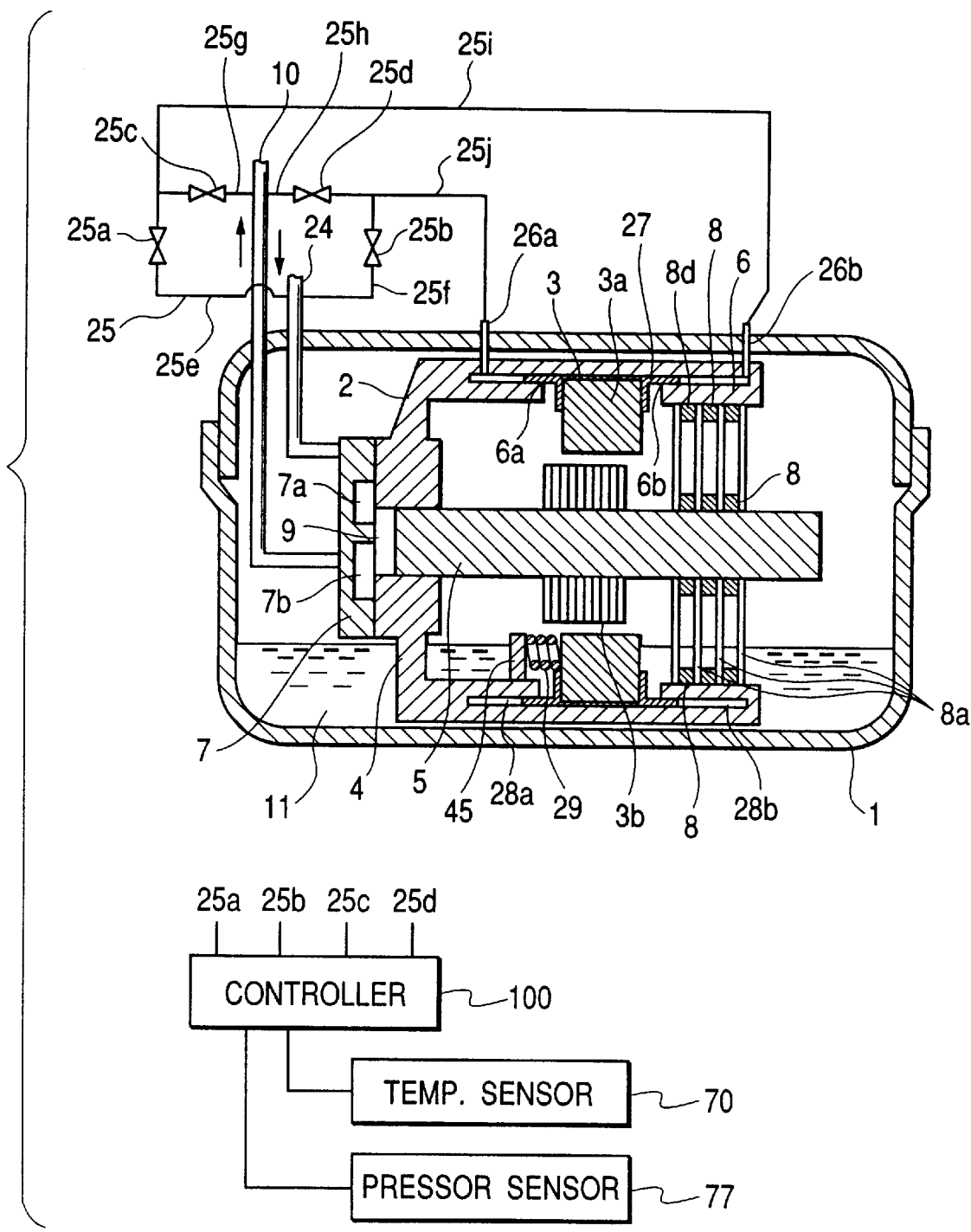
FIG. 4 is a cross sectional view which shows a linear compressor according to the third embodiment of the invention.

FIG. 4 shows a linear compressor according to the third embodiment of the invention which is different from the one shown in FIG. 3 only in that a coil spring 29 is disposed between a holder 45 mounted on an inner wall of the hollow block 6 and the stator 3*a* of the linear motor 3 which produces a spring pressure to hold the stator 3*a* from being shifted left, as viewed in the drawing. Other arrangements are identical, and explanation thereof in detail will be omitted here.

When the linear compressor of the second embodiment in FIG. 3 is turned off, the linear motor 3 may be stopped with the stator 3a being shifted left, as viewed in the drawing, away from a desired center of oscillation of the piston 5. When the linear compressor is turned on from this state, it may cause the piston 5 to pass over the top dead center and collide with the inner wall of the cylinder block 7. The coil spring 45 of this embodiment, as described above, holds the stator 3a in a desired position (e.g., the desired center of oscillation of the piston 5) when the pressures within the back pressure chambers 28a and 28b are balanced after the linear compressor is turned off, thereby avoiding the collision of the piston with the inner wall of the cylinder block 7 immediately after the linear compressor is turned on.

Instead of the coil spring 29, an elastic member such as rubber may be used.

Figure 5:
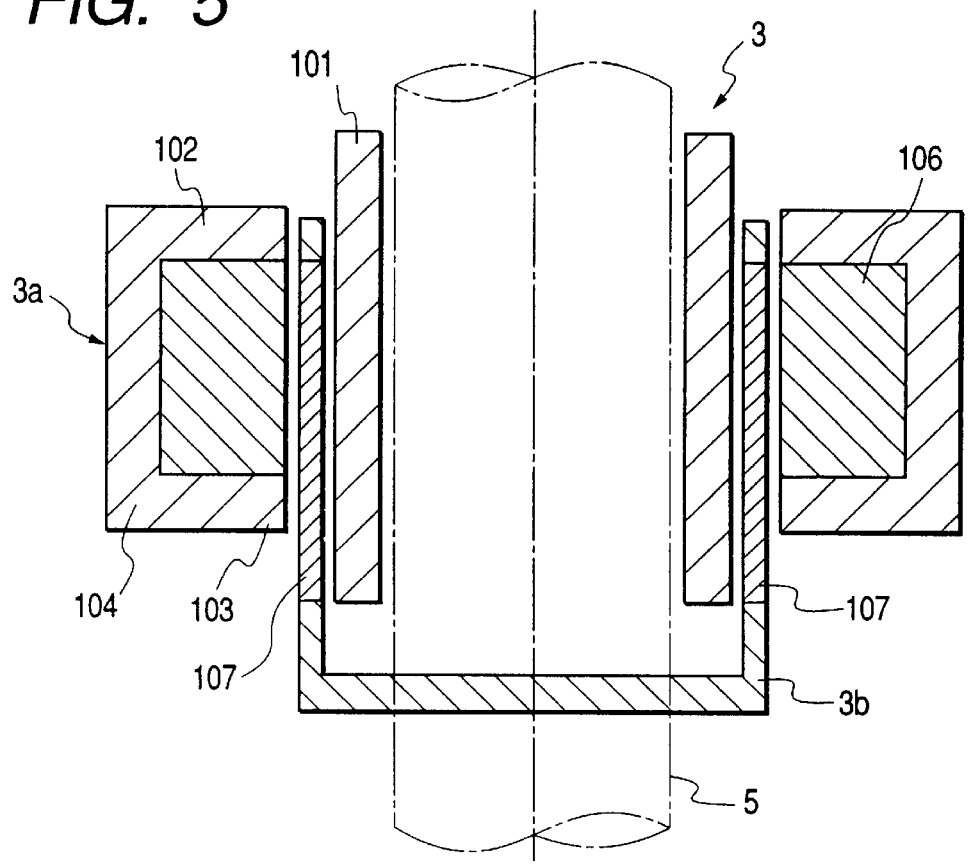
FIG. 5 is a partially cross sectional view which shows a linear motor may be used in linear compressors of the first to third embodiments.

FIG. 5 shows a linear motor 3 which may be employed in the above embodiments.

The linear motor 3 consists essentially of a stator 3a and a rotor 3b. The stator 3a includes an annular inner yoke 101, an annular outer yoke 104, and a coil 106. The inner yoke 101 and the outer yoke 104 are secured on the hollow block 6, as shown in FIG. 1. The outer yoke 104 has two magnetic poles 102 and 103. The rotor 3b includes a cylindrical permanent magnet 107 and has the piston 5 pass through the bottom thereof.

Figure 6:
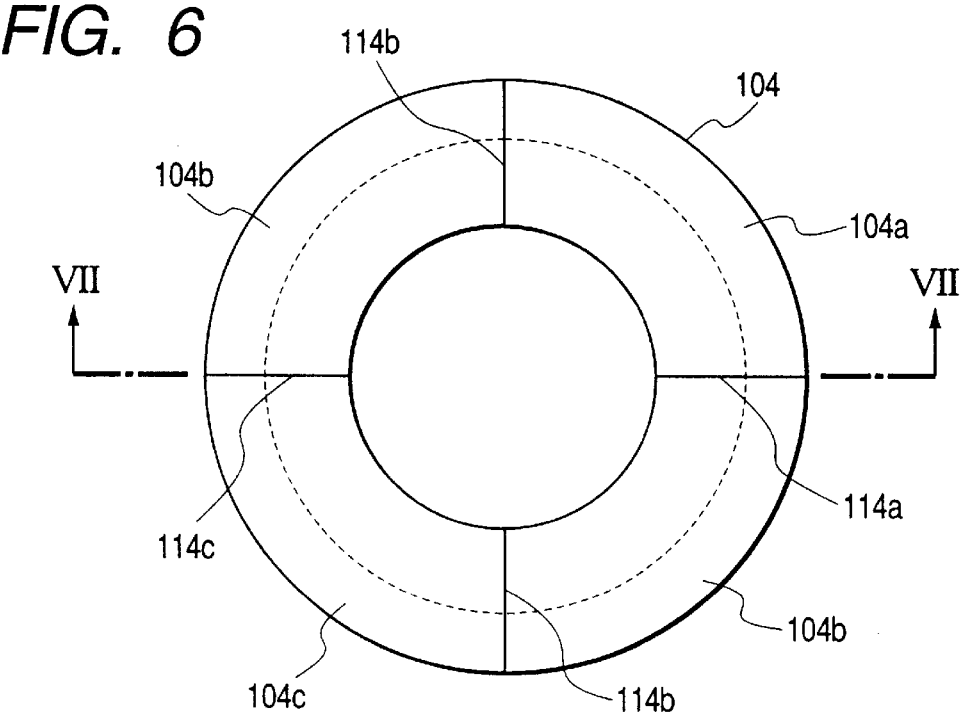
FIG. 6 is a top view which shows an outer yoke of the linear motor of FIG. 5.
Figure 7:
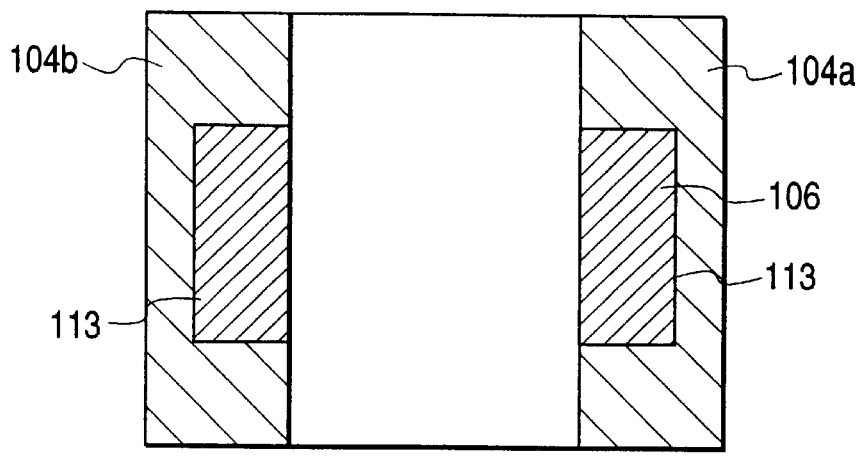
FIG. 7 is a longitudinal cross sectional view taken along the line VII—VII in FIG. 6.
Figure 9:
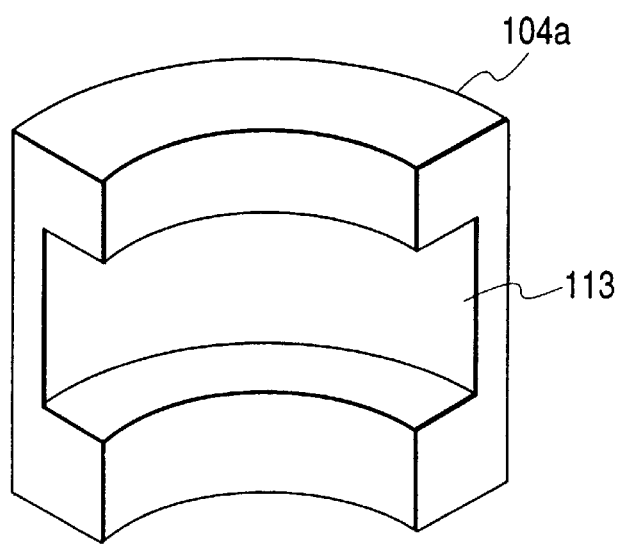
FIG. 9 is a perspective view which shows one of separate blocks making up the outer yoke of FIGS. 6 and 7.

The outer yoke 104 includes, as shown in FIG. 6, a plurality of separate blocks 104a, 104b, 104c, and 104d whose end surfaces 114a, 114b, 114c, and 114d are glued or welded to each other. Each of the blocks 104a to 104d has, as shown in FIGS. 7 and 9, formed in an inner wall thereof a groove 113 in which the coil 106 is fitted.

The outer yoke 104 may be formed with at least two separate blocks.

Figure 8:
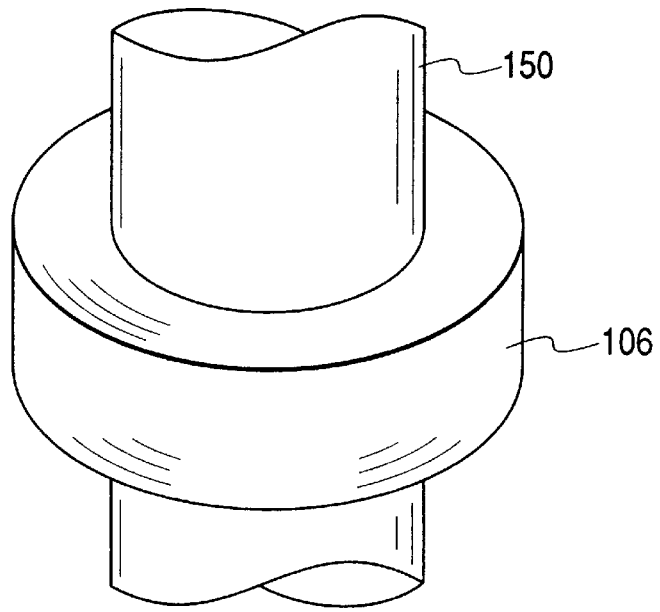
FIG. 8 is a perspective view which shows fabrication of a coil fitted in the outer yoke of FIGS. 6 and 7.

In fabrication of the coil 106 and the outer yoke 104, the coil 106 is, as shown in FIG. 8, first made by tensioning and winding wire around a bobbin 150 outward in a radial direction at high density. Next, the bobbin 150 is drawn from the coil 106 and fitted into the grooves 113 of the blocks 104a to 104d of the outer yoke 104. Finally, the blocks 104a to 104d are glued or welded to each other to make up the outer yoke 104.

The coil 106 may be impregnated with a resin liquid for avoiding deformation and protection thereof.

In conventional linear motors, a stator is usually made by winding wire within a groove formed in an inner wall of a one-piece annular outer yoke inward in a radial direction. It is, thus, difficult to wind the wire under high tension. In contrast to this, the stator 3a of this embodiment is, as described above, made by fitting the coil 106, which is formed by winding the wire outward in the radial direction under high tension, in the grooves 113 of the blocks 104a to 104d and joining the blocks 104a to 104d to complete the outer yoke 104. The coil 106 of this embodiment, therefore, has a higher space factor and a greater number of turns per volume as compared with the conventional linear motors. This reduces a copper loss that is proportional to the square of current flowing through the coil, thereby resulting in greatly improved efficiency of the linear motor 3.

Figure 10:
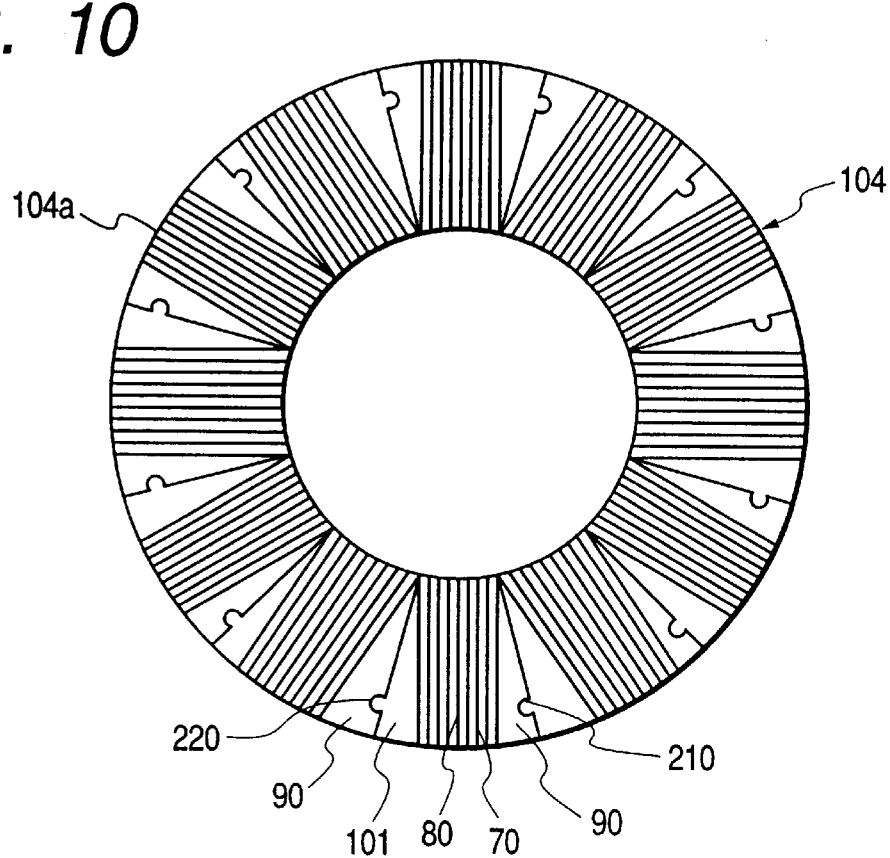
FIG. 10 is a top view which shows a modification of the outer yoke in FIG. 5.
Figure 11:
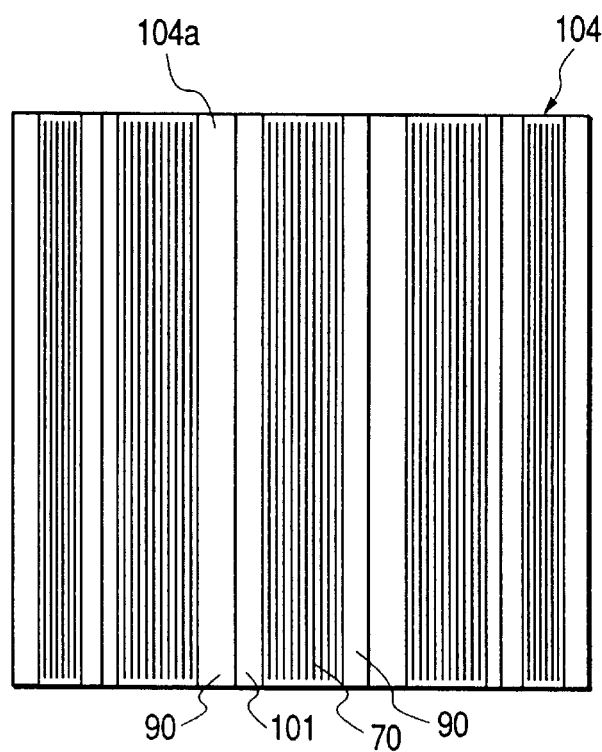
FIG. 11 is a side view of FIG. 10.
Figure 12:
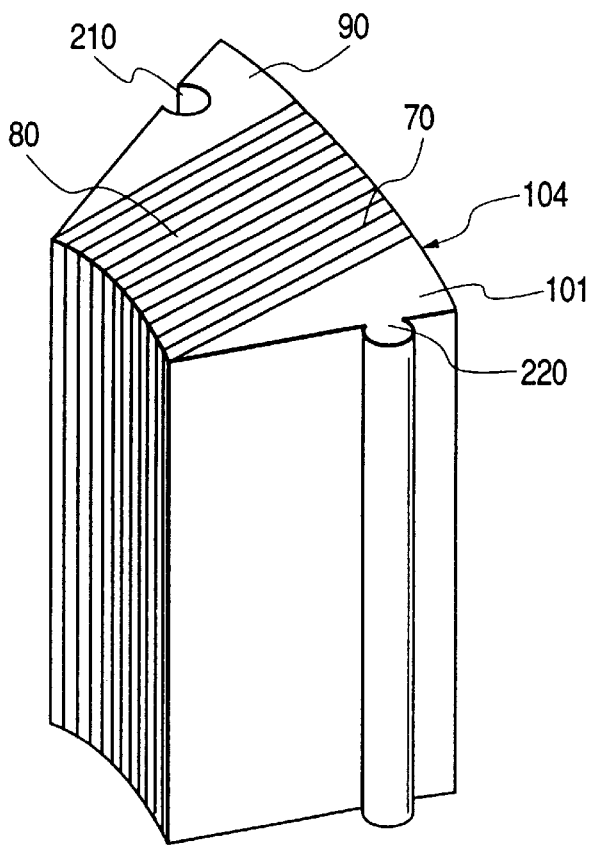
FIG. 12 is a perspective view which shows one of the separate blocks of FIGS. 10 and 11.

FIGS. 10, 11, and 12 show the first modification of the outer yoke 104 used in the linear motor 3.

The outer yoke 104 of this embodiment includes twelve fan-shaped separate blocks 104a identical in size and shape with each other. Each of the separate blocks 104a consists of a central portion 80 and first and second outer portions 90 and 101. The central portion 80 is formed with quadrangular prism-shaped laminations 70 made from a material having a higher permeability. The first and second outer portions 90 and 101 are each formed with a triangular prism-shaped member made from, for example, resin having the permeability lower than that of the central portion 80 and the electric resistance greater than that of the central portion 80. Each of the blocks 104 is fabricated by sandwiching the central portion 80 between the first and second portions 90 and 101 and impregnating them with resin.

Each of the first outer portions 90 has, as shown in FIGS. 10 and 12, formed therein a circular recess or groove 210. Each of the second outer portions 101 has, as clearly shown in FIG. 12, formed therein a cylindrical protrusion 220. The assembly of the outer yoke 104 is accomplished by inserting the cylindrical protrusion 220 of each of the second outer portions 101 into the circular groove 210 of one of the first outer portion 90 from an axial direction thereof to join all the blocks 104a.

Each of the blocks 104 may be surface-finished before the outer yoke 104 is assembled. Alternatively, the outer yoke 104 may be surface-finished after being assembled.

The eddy current loss of a linear motor is usually proportional to the square of the thickness of a yoke, but decreased greatly in this embodiment by the formation of the central portion 80 of the outer yoke 104 with the laminations 70 having the higher permeability, which results in greatly improved efficiency of the linear motor 3.

Each of the blocks 104, as described above, has disposed on both sides of the central portion 70 the first and second outer portions 90 and 101 each having the lower permeability and higher resistance, thereby minimizing the leakage of magnetic flux from the central portion 70 of each of the blocks 104 to adjacent one, thus resulting in a decrease in copper loss.

The outer yoke 104 of this embodiment does not have the coil 106, but may have the same as needed.

The inner yoke 101 shown in FIG. 5 may be fabricated in the same manner as described above.

Figure 13:
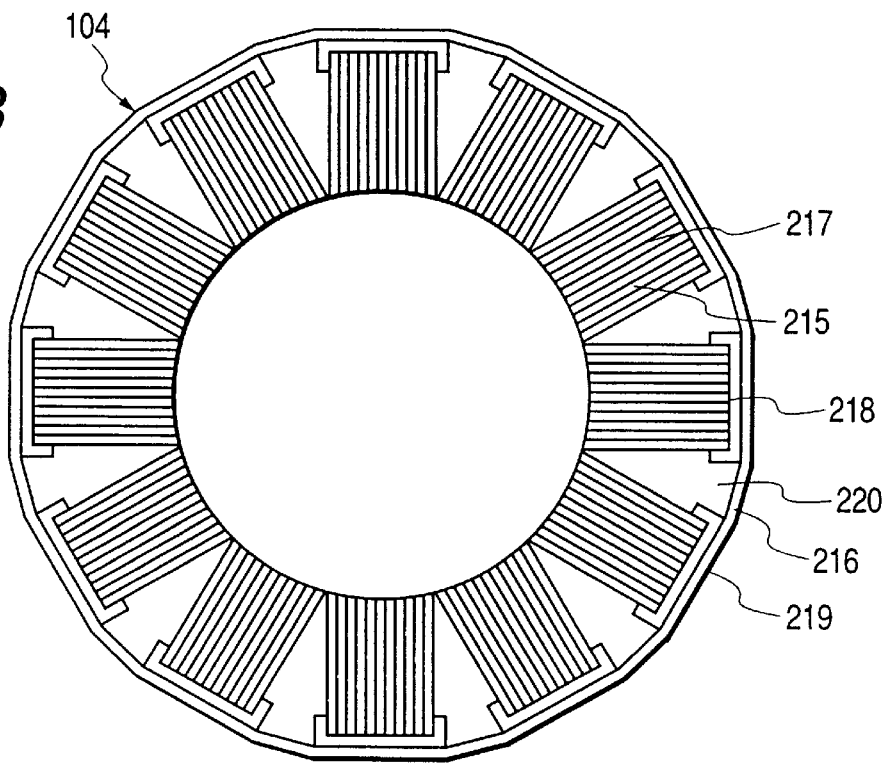
FIG. 13 is a top view which shows a second modification of the outer yoke in FIG. 5.
Figure 14:
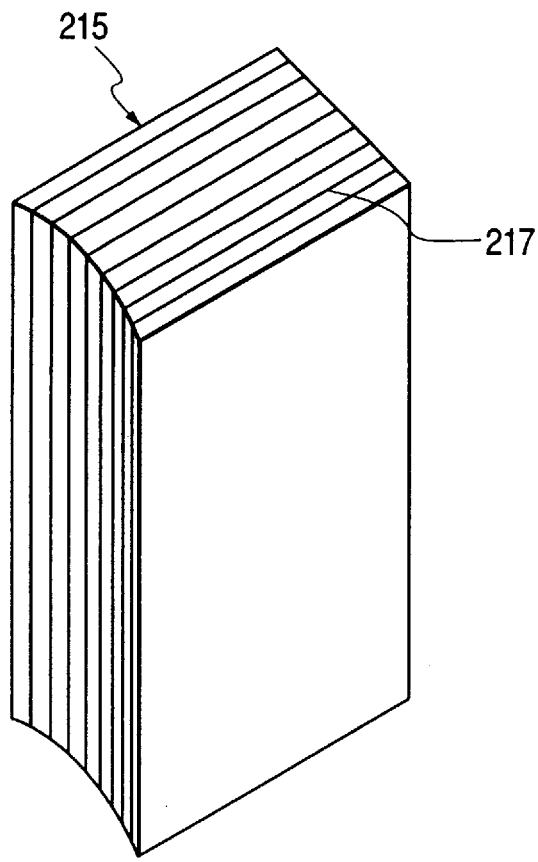
FIG. 14 is a perspective view which shows one of separate blocks in FIG. 13.
Figure 15:
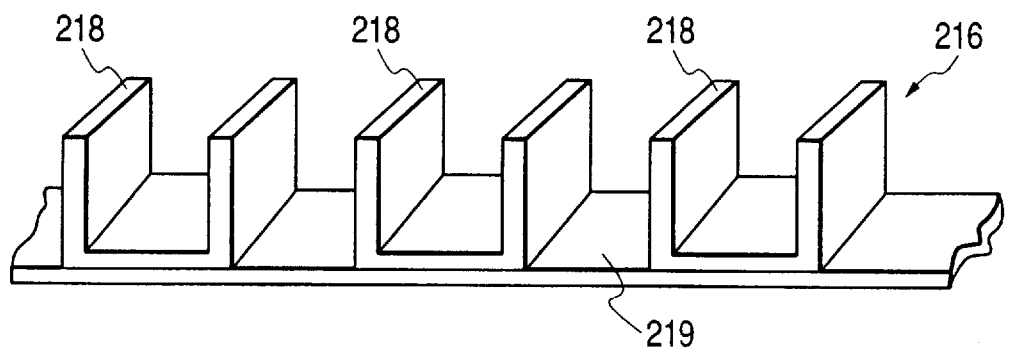
FIG. 15 is a perspective view which shows a block retainer in FIG. 13.

FIGS. 13, 14, and 15 show the first modification of the outer yoke 104 used in the linear motor 3.

The outer yoke 104 of this embodiment includes twelve separate blocks 215 and an annular block retainer 216. Each of the blocks 215 is, as clearly shown in FIG. 14, formed with quadrangular prism-shaped laminations 217 made from a material having a higher permeability. The block retainer 216, as clearly shown in FIG. 15, consists of a strip member 219 and twelve C-shaped holders 218. The strip member 219 is flexible and made of, for example, resin which has the permeability lower than that of the blocks 215 and the resistance greater than that of the blocks 215. This avoids the flow of magnetic flux through the strip member 219 between adjacent two of the blocks 215, thereby minimizing the copper loss.

The C-shaped holders 218 are glued on an inner surface of the strip member 219 at regular intervals and hold therein the blocks 215, as shown in FIG. 13, in a circumferential direction with regular gaps 220. The formation of the gaps 220 between adjacent two of the blocks 215 increases a surface area of the outer yoke 104, thereby facilitating the cooling of the linear motor 3.

The outer yoke 104 of this embodiment does not have the coil 106, but may have the same as needed.

The inner yoke 101 shown in FIG. 5 may be fabricated in the same manner as described above.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A linear motor comprising:

a rotor; and a stator including a coil and an annular yoke retaining therein the coil, the yoke being made of a plurality of arc-shaped blocks each of which has formed therein a groove in which a peripheral portion of the coil is fitted.

2. A linear motor comprising:

a rotor; and a stator including an annular yoke, the yoke being formed with a plurality of blocks each constituting a circumferential portion of the yoke, each of the blocks including a central section and first and second outer sections disposed on both sides of the central section, the central section being made consisting of laminations made from a material having a higher permeability, the first and second outer sections each being made from a material having a permeability lower than that of the central section and an electric resistance greater than that of the central section.

3. A linear motor as set forth in claim 2, wherein the laminations making up the central section of each of the blocks of the yoke are laid to overlap each other in a circumferential direction of the yoke.

4. A linear motor as set forth in claim 3, wherein the central section of each of the blocks of the yoke is quadrangular prism-shaped, and each of the first and second outer sections is triangular prism-shaped.

5. A linear motor as set forth in claim 2, wherein the central section and the first and second outer sections are joined to each other using resin.

6. A linear motor as set forth in claim 2, wherein the first outer section of each of the blocks of the yoke has a protrusion formed on a surface facing in a circumferential direction of the yoke, and the second outer section has formed in a surface facing the circumferential direction of the yoke a groove in which the protrusion is fitted for joining the blocks to each other to complete the yoke.

7. A linear motor comprising:

a rotor;

a stator including an annular yoke, the yoke being formed with a plurality of blocks each constituting a circumferential portion of the yoke, each of the blocks being formed with laminations made from a material having a higher permeability; and an annular retainer retaining the blocks on an inner surface thereof at regular intervals in a circumferential direction of the retainer, said retainer including a strip member and holders, the strip member being made from a material having a permeability lower than that of the yoke and an electric resistance greater than that of the yoke, each of the holders holding therein one of the blocks and being glued on the strip member.

8. A linear motor as set forth in claim 7, wherein each of the holders is made of a C-shaped member having disposed therein one of the blocks.

* * * * *